Oct. 6, 1964 P. E. OHMART 3,152,254
METHOD AND APPARATUS FOR CONVERTING IONIC
ENERGY INTO ELECTRICAL ENERGY
Filed June 13, 1956 4 Sheets-Sheet 1

INVENTOR.
Philip E. Ohmart.
BY
Wood, Herron & Evans
ATTORNEYS.

INVENTOR.
Philip E. Ohmart.
BY
Wood, Herron & Evans.
ATTORNEYS.

United States Patent Office 3,152,254
Patented Oct. 6, 1964

3,152,254
METHOD AND APPARATUS FOR CONVERTING IONIC ENERGY INTO ELECTRICAL ENERGY
Philip E. Ohmart, Cincinnati, Ohio, assignor to The Ohmart Corporation, Cincinnati, Ohio, a corporation of Ohio
Filed June 13, 1956, Ser. No. 591,173
5 Claims. (Cl. 250—83.6)

This invention relates to a method of converting ionic energy directly into electrical current in a metallic electrical conductor, and to a method of using the current so generated as a co-variant for indexing or measuring one or more of the variables which are factors in the generation of the current.

In my co-pending application, Serial No. 233,718, filed June 27, 1951, entitled "Radio Electric Generator," now Patent No. 2,696,564, I disclose and claim a cell for transforming radioactive energy directly into electrical current and utilizing the cell which accomplishes the transformaiton as a detector of radioactivity by measuring the voltage of the cell. The method which is herein disclosed and claimed comprehends in part the radioactive phenomena disclosed in the co-pending application, but also discloses more generic aspects of the phenomena disclosed specifically in the original application. The present application is a continuation-in-part of my application for "Method of Converting Ionic Energy Into Electrical Energy," Serial No. 266,883, filed January 10, 1952, now abandoned.

My application entitled "Radio Electric Generator" was predicated on my discovery that if two chemically dissimilar electrodes, connected by a metallic circuit, are exposed to radioactivity in the presence of an ionizable gas, then current flows through the connecting circuit from one electrode to the other. I proposed to use this effect to detect radioactivity. I have since discovered and determined that this type of circuit may be activated to produce current between two chemically dissimilar electrodes in the absence of radioactivity; that is, that the bombardment of the electrodes by the radioactive particles is not necessary to produce the flow of current between the dissimilar electrodes, and that the same current creating effect is had if the electrodes are immersed in an ion plasma, however created. Thus, I may establish a flow of current through a conductor between two chemically dissimilar electrodes exposed to an ionic plasma by discharging an electric current through an ionizable gas, by irradiating such a gas with ultraviolet light, by subjecting the gas to a corona effect, as well as by subjecting the gas to radioactivity.

These new determinations require the postulation of a new and heretofore undiscovered field effect which may be broadly characterized as an asymmetric field produced by chemically dissimilar electrode surfaces. At present, no empirical means for identifying or designating the field is known except for the now determined differential migration of ions in the field in a manner contradictory to the heretofore known behavior of electrostatic fields.

More specifically, if two electrodes which have surfaces which are the same chemically are associated with an ionic plasma, then no potential difference between the electrodes is developed for the simple reason that if a positive or a negative charge were to tend to build up on either electrode, the electrode would immediately repell ions of like polarity and attract ions of opposite polarity. However, if the electrode surfaces are dissimilar, this well recognized law of electrostatics no longer applies, and a potential difference between the electrodes develops until the potential difference is of sufficient magnitude to nullify the field effect produced by the chemical dissimilarity of the surfaces.

At first blush, it appeared that the field effect under discussion had analogy to the electropositive-electronegative characteristics of the electrode surfaces or to the work functions of these materials, or both, but more exhaustive investigation has determined that the analogies are but partial and circumstantial rather than valid. While I have been able to generalize that a limited and characteristic potential develops between two electrodes as a function of the chemical dissimilarity of their surfaces, no table showing the characteristic maximum potential for various combinations of dissimilar surfaces can be developed from any of the well-known tables previously used for non-analogous purposes.

Thus, it appears that for every possible combination of compositions of electrode surfaces, a different maximum electrical potential will develop in the presence of an ionic plasma. Further, this maximum difference is not a function of the intensity of the radiation or of the tendency of the gas to ionize, or of the spacing of the electrodes, but is exclusively a function of the chemical dissimilarity or asymmetry of the surfaces of the electrodes. The intensity of the ionized energy, the nature and pressure of the gas, the spacing and size of the electrodes and the degree of adsorbtion of gas on the electrode surfaces all combine to determine the rate at which maximum potential between the electrodes develops, but however these conditions may be varied, the maximum voltage of any given electrode combination is a function of the chemical asymmetry of the electrode surfaces, or of the field asymmetry, or bias which the dissimilarity of the electrode surfaces produces.

I have also discovered that the field asymmetry is, in general, though not always, affected by the temperature of the electrodes, or rather that the temperature of the electrodes affects the field asymmetry to different degrees, depending upon the specific combinations of different materials which are employed as the electrode surfaces. Further, some of these combinations may be temperature sensitive in one difference of potential range, and less sensitive in another difference of potential range.

In this regard, the difference of potential which exists between the electrodes at any one time may be regarded as a relief of field stress or a mitigation of field asymmetry, so that electrodes of high dissimilarity and at high potential may have ion segregating efficiency equal only to that of electrodes of lower asymmetry at lower potential.

This determination leads to the somewhat confusing conclusion that the field bias or asymmetry is or may be controlled or influenced by the nature of the external circuit which connects the electrodes. This phenomena is best understood if considered from a time angle. Thus, if a charge is permitted to build on two dissimilar electrodes which ultimately produces an open circuit voltage reading of two volts, the charge builds up comparatively rapidly at first, then more slowly as the stress resulting from the dissimilarity of the electrodes is alleviated by the development of potential difference between them. Furthermore if a leakage type of resistance is introduced into the circuit between the two electrodes, maximum open circuit voltage will not be attained because of the operation of two variables.

First, as the potential difference builds up above a critical level, more and more current flows through the fixed resistance between the electrodes in the external circuit, thereby slowing down the rate at which difference of potential is tending to build up. Second, as the potential builds up, the asymmetry of the electrodes becomes less and approaches chemical equivalency as a limit. As a practical result, two electrodes which are connected by an external leakage circuit will never develop a closed circuit difference of potential equal to their characteristic open circuit difference of potential. Nevertheless, for a given external resistance an equilibrium condition will be reached which will be characterized by a stable closed circuit voltage of some value less than the characteristic open circuit voltage of the electrodes.

The closed circuit voltage will depend upon all of the factors enumerated above as affecting the rate of maximum potential build up. Thus, either the rate of build up of difference of potential between the electrodes, using time as an index, or the stable closed circuit voltage or the attendant amperage may be used as an index for measuring the field variables.

To illustrate the manner in which one variable condition may be determined by measuring the effect of its variation on a covariant quantity, a number of graphs are included in which values of one condition are plotted against corresponding values of another.

Figure 5:
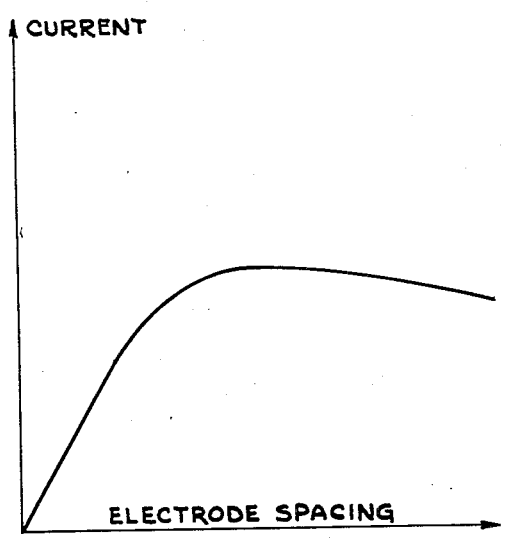

FIGURE 5 indicates the variation of current with electrode spacing.

Figure 6:
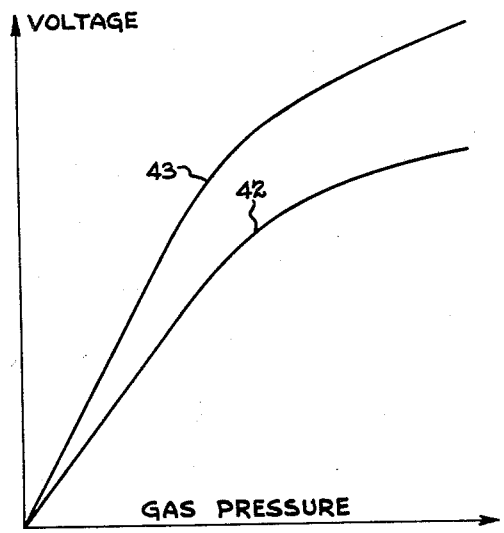

FIGURE 6 shows the manner in which gas pressure affects developed voltage.

Figure 7:
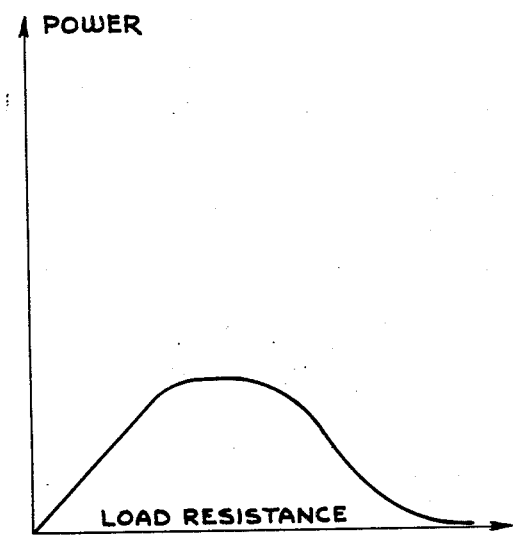

FIGURE 7 shows the variation of power developed with change in load resistance.

Figure 8:
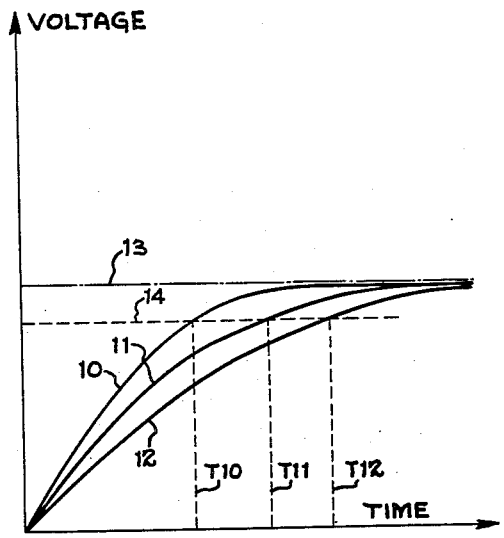

FIGURE 8 indicates the general manner in which open circuit voltage varies with time during the build up of potential from zero to characteristic open circuit voltage.

Figure 9:
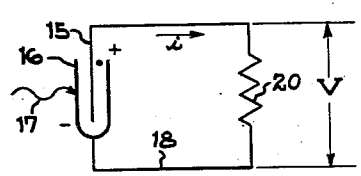

FIGURE 9 is a schematic circuit diagram of a cell and external resistance circuit labeled to show the various quantities measured to obtain closed circuit values.

Figure 10:
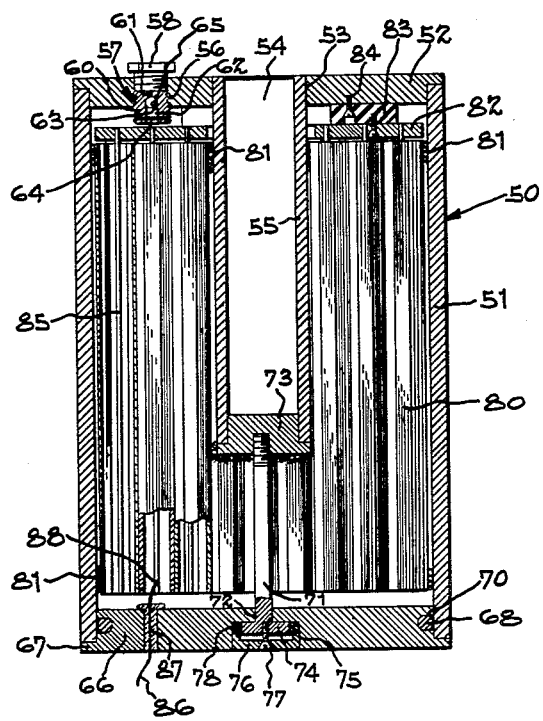

FIGURE 10 is a longitudinal cross sectional view through one form of cell.

Figure 11:
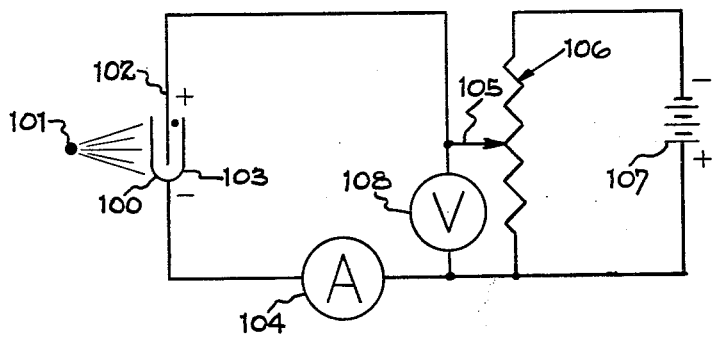

FIGURE 11 is a schematic circuit diagram of an arrangement for measuring the open circuit voltage of a cell.

Figure 12:
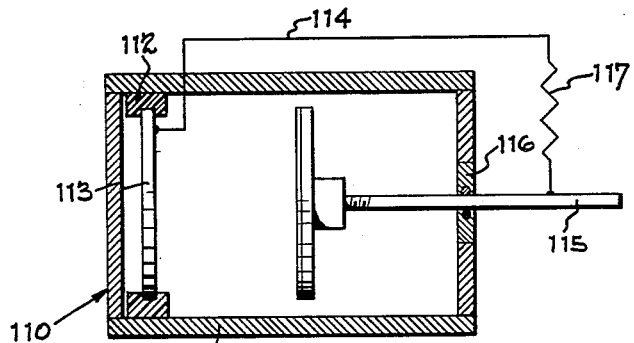

FIGURE 12 is a semi-diagrammatic cross sectional view of a cell embodying a movable electrode.

Figure 13:
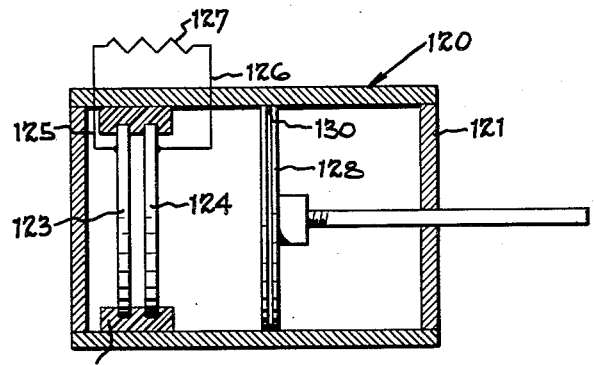

FIGURE 13 is a semi-diagrammatic cross sectional view of a cell including means for varying the gas pressure.

Figure 14:
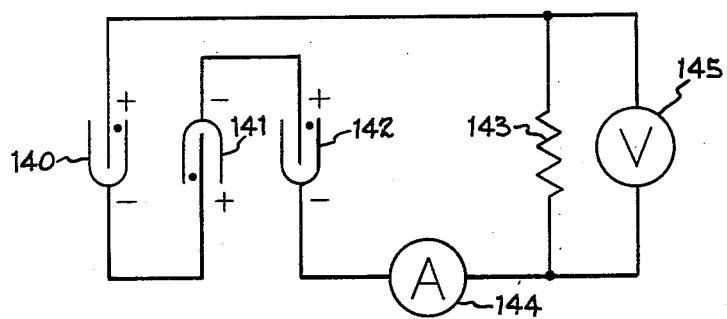

FIGURE 14 is a schematic circuit diagram of an arrangement for measuring the power generated by a plurality of series connected cells.

In general a device, or "cell," for carrying out the conversion of ionic energy into electrical energy, according to the principles of this invention, includes two dissimilar electrodes, and an envelope containing the electrodes and a gas; a source of energy for ionizing the gas is also requisite and may either constitute part of the cell itself or may be entirely separate.

One suitable form of cell adapted to convert ionic energy into electrical energy in accordance with the principles of the present invention is shown in FIGURE 10. The specific cell shown is disclosed in my above identified co-pending application entitled "Ohmart Cells For Measuring Radiation," Serial No. 259,341, filed December 1, 1951, now abandoned in favor of continuing application Serial No. 597,536, filed July 12, 1956, for Radiant Energy Electric Generator for Measuring Radiation. It is to be understood, however, that this cell is disclosed by way of illustration, and that the present invention contemplates the use of cells of other constructions as well. As shown in FIGURE 10, cell 50 comprises a cylindrical housing 51 having a top 52 brazed or soldered thereto. The top 52 is provided with a central aperture 53 opening into well 54, which is formed by a piece of tubing 55 secured to the top and depending into the casing. A second aperture 56 in the top 52 is threaded to receive valve 57 and closure plug 58, by means of which the cell may be sealed after it has been exhausted and filled with gas. The valve 57 includes a housing 60 which is threaded into aperture 56, and is provided with a central bore 61 and a larger ball receiving chamber 62. A ball 63 fits loosely in chamber 62 and is retained by pin 64. The inner walls of the valve housing 60 are tapeerd as at 65 to form a seat for the ball 63.

When exhausting the cell of gas a vacuum pump is connected as by a threaded fitting to opening 56; the ball 63 remains out of contact with the seat 65 due to the downward pull of gravity. Ball 63 remains unseated and opening 62 remains unconstricted while a filling gas is forced into the cell through the same fitting. However, when the gas hose fitting is removed, the ball is forced upwardly by the pressure of the gas within the cell and is urged against the seat to retain the gas within the cell until the closure plug is threaded into place. It will, of course, be understood that the valve may be mounted on the bottom plate or the casing wall as well as in the top plate.

The bottom of the cell is closed by means of a circular plate 66 having a peripheral flange 67 for engagement with the bottom of the shell 51. An O ring 68 residing in channel 70 provided in the bottom plate 66 is compressed between the plate and shell wall to provide a gas-tight seal. The bottom plate 66 is held in place tightly against the shell by means of assembly bolt 71 which passes through opening 72 provided in plate 66 and threadably engages a plug 73 soldered or brazed to tube 55 to form the bottom of the well. Obviously this shelf could be made integral with the tube, thereby eliminating the need for plug 73. Preferably, head 74 of bolt 71 resides completely within counterbored opening 75 and is covered by cap 76 which is secured to head 74 by bolt 77. An O ring 78 is provided about the periphery of head 74 and is compressed by cap 76 to form a gas-tight seal around the bolt.

Cell 50 includes electrodes of the honeycomb or multicellular type. One electrode comprises a honeycomb 80 preferably formed from a metallic foil such as bismuth or lead foil which may be coated with an oxide or a second pure metal. The honeycomb which is soldered to the housing and tube as at 81, forms a plurality of pockets extending longitudinally of the cell. The second electrode comprises a carrier disc 82 which is secured to the top plate 52 by insulators 83 and bolts 84. A plurality of wires or rods 85 formed of a material electrochemically dissimilar to the honeycomb electrode are secured to carrier disc 82, each rod depending into a pocket of the honeycomb electrode. Lead in wire 86 to the rod electrodes is brought in through glass to kovar seal 87 and is soldered to one of the rods as at 88. The ionizable filling gas contacts the exposed surfaces of honeycomb electrodes 80 and rod electrodes 85. When the gas is ionized by exposure to radiant energy, as for example, by radiations from radioactive material within well 54, a discriminatory migration of ions and electrons occurs in the field between the rods and honeycomb electrodes.

The accompanying diagrams illustrate the general manner in which various characteristics of the cell are related to one another. These graphs are more or less composite plots of the behavior of many cells, and while any given cell may differ slightly, its behavior will generally conform to the graphs shown. Fundamentally two types of measurements are made and used as a basis for indexing any variable condition to be determined. One type of measurement which is made is that of open circuit voltage, or more specifically, the length of time required by the cell to build up from zero voltage, or a short circuited condition, to a predetermined fraction of the characteristics open circuit potential of the cell.

In making a measurement of this type, the two cell electrodes are not connected through an external leakage path, consequently the only factor inhibiting potential build up is the decreasing of chemical asymmetry. The open circuit voltage may be measured in any of a number of conventional manners. For example, an electron voltmeter may be connected between the electrodes or a potentiometer and voltage source may be connected in such a manner that the potential of the voltage source is opposed to that of the cell. Then by adjusting the potentiometer until the current flow in the circuit is zero, the open circuit voltage of the cell may be measured across the potentiometer.

One circuit of this type is shown schematically in FIG. 11. As shown, a cell 100, subjected to ionizing radiations from a source 101, includes a positive electrode 102 formed of a material such as lead oxide and negative electrode 103 formed from zinc. The electrodes of the cell are placed in series with a current measurnig device 104 and movable contact 105 of potentiometer coil 106. A source of potential, such as battery 107 is connected across the coil 106 so that the battery tends to cause a current flow in a direction opposite to the current produced by the cell. A potential measuring instrument 108 is connected to one end of the coil and the movable contact 105.

As explained earlier, if the electrodes of any cell are immersed in an ion plasma, the difference of potential between the electrodes will eventually reach a characteristic maximum open circuit potential which is determined solely by the chemical characteristic of the electrode surfaces. However, the length of time required for a cell to reach this characteristic maximum potential will vary in accordance with changes in any of the various factors such as gas pressure, electrode spacing, ionization intensity, and the like, which were earlier enumerated. Consequently, the length of time required for a cell to reach its characteristic open circuit potential may be used as an index for determining the variation in any of these factors.

Suppose for example, that it is desired to measure the intensity of an ionizing medium such as a radioactive or an ultraviolet source. Initially a cell could be calibrated by subjecting it to ionizing sources of known strength and noting the length of time required for the cell to reach maximum potential, each length of time would correspond to a different degree of ionizing intensity. Thereafter by exposing the cell to an unknown source and comparing the length of time required to reach maximum potential with the previously observed times, the intensity of the unknown ionizing medium could be determined.

It is preferable, however, to measure the time required for the cell to reach some predetermined fraction of its characteristic voltage rather than the full voltage. Thus by measuring the length of time required to reach 9/10 of open circuit voltage, for example, the time consumed in making measurements is reduced, and furthermore a less sensitive voltage measurement is required, since the voltage changes quite gradually as it nears the characteristic potential, while at lower vlaues it changes much more rapidly.

The general method of utilizing open circuit voltage measurements to index other cell variables is illustrated in FIGURE 8. Curves 10, 11 and 12 represent variations in open circuit potential of a cell with time, as the cell voltage builds up, under three conditions, from zero to its characteristic open circuit potential, indicated by line 13. Thus line 10 might represent the build up of potential when a cell is subjected to an ionizing source of one strength, line 11 the bulid up when exposed to another source and line 12 the build up when exposed to a third source. On the other hand, lines 10, 11 and 12 might represent potential build up under different pressures, or for different electrode spacings, or for any other set of conditions, in which one of the cell variables is changing. In any case the method of making the measurements is the same.

As shown diagrammatically in FIGURE 8, the cell is first short circuited to bring the electrodes to zero potential. Then the short circuit is opened and the electrode potential allowed to rise. The time required for the potential to reach a predetermined arbitrary value, indicated by line 14, is measured and this time is then compared with the time required to reach the same potential under known conditions. In this manner, times T10, T11 and T12, which are the required build up times for the cell under conditions corresponding to those indicated by curves 10, 11 and 12, may be used to index any variable characteristic of the cells.

In addition to using the rate of change of open circuit voltage of a cell to index variable characteristics, a cell can be operated at its characteristic open circuit potential and used as a constant voltage source. That is, the characteristic or equilibrium open circuit voltage of a cell depends solely upon electrode composition, which is not affected by the operation of the cell. Consequently, by properly protecting the electrodes from oxidation, or other deterioration, a cell can furnish a constant open circuit voltage for an indefinite period of time. Such a source of constant voltage can be used as a reference voltage in servo-control and radar time basis circuits, telemetering systems and the like.

The second type of measurement which can be used to index cell variables is that of closed circuit equilibrium voltage or amperage. While the cell will always approach the same open circuit potential regardless of any variation in cell characteristics (other than changes in electrode material properties) under closed circuit conditions, the cell will reach a different, stable or equilibrium condition for each set of cell characteristics. Therefore, when making closed circuit measurements, steady state current or voltage is measured, whereas in open circuit operation transient effects, or the rate of change of cell potential from one condition to another is used to index variables.

The circuit employed for measuring closed circuit current or voltage is shown diagrammatically in FIGURE 9. As shown, a cell having a first electrode 15 and a second electrode 16 is subjected to an ionizing source 17. The two electrodes are joined through external lead 18 and leakage resistance 20. Closed circuit voltage is measured across the resistance 20; the conventional current, indicated by $i$, flows in the direction indicated and can be measured anywhere in line 18.

Figure 1:
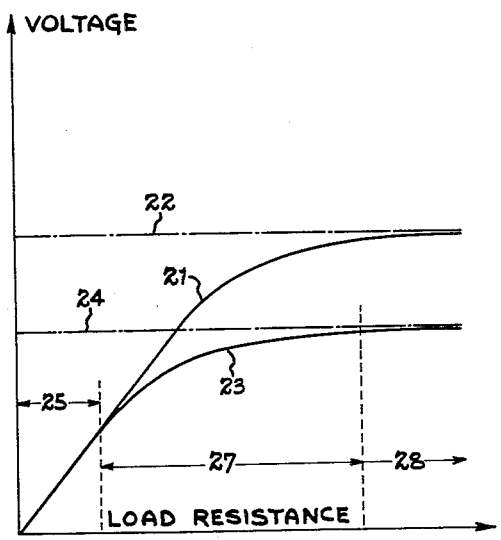
FIGURE 1 shows the variation of developed voltage with external leakage resistance.

I have determined that one of the factors affecting the developed closed circuit voltage is the magnitude of the external load resistance. The effect of external resistance upon equilibrium closed circuit potential is shown in FIGURE 1. In that figure the developed voltages of two cells are plotted against values of load resistance. Curve 21 represents the developed voltage of a cell having a characteristic open circuit potential indicated by line 22, while curve 23 indicates the developed voltage of a cell having a characteristic open circuit potential indicated by line 24. It will be noted that both of these curves are of the same general shape indicating that no matter what the characteristic open circuit voltage of a cell is, it will behave in substantially the same manner when provided with a varying external leakage resistance.

Considering curve 23, it is apparent that there are three separate ranges of external resistance each having a corresponding type of voltage variation. In the first range, indicated at 25, the voltage increases linearly with increases in load resistance. In the second region, indicated at 27, the voltage increases logarithmically with increases in load resistance, and in the third range 28 the voltage asymptotically approaches the charactistic open circuit potential of the cell and consequently changes very little even for substantial variations in resistance. The developed closed circuit voltage of any cell will vary in each of these three different ways over certain ranges of load resistance.

Each of these three ranges of voltage behavior is particularly advantageous for making certain kinds of measurements. For instance, in the linear voltage range, changes in electrode materials affecting their chemical asymmetry are not reflected in developed voltage. Hence when making voltage measurements to index a variable, under conditions in which the electrodes are apt to oxidize or where the cell is subjected to temperature fluctuations affecting the chemical asymmetry of the electrodes, measurements should be made in the linear region. Further uses for this range will be noted in conjunction with a description of the other diagrams.

Figure 2:
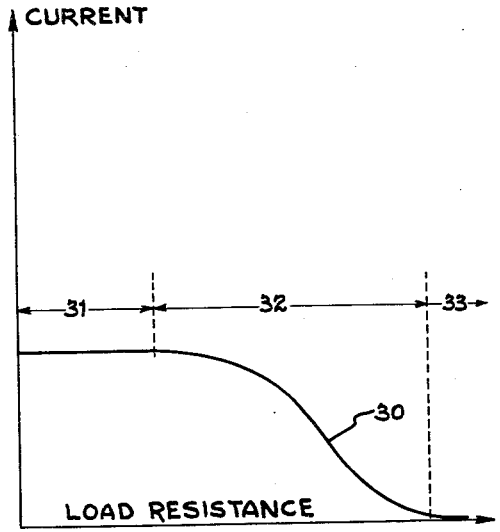
FIGURE 2 shows the variation of current with external leakage resistance.

The second range is the logarithmic range in which the voltage varies exponentially with changes in resistance. As explained more fully in my copending application, Serial No. 259,341, filed December 1, 1951, on "Ohmart Cells For Measuring Radiation," now abandoned in favor of continuing application Serial No. 597,536, filed July 12, 1956, for "Radiant Energy Electric Generator For Measuring Radiation," there is a critical value of resistance at which the voltage ceases to vary linearly with increases in resistance. When the leakage resistance exceeds this critical value, the developed voltage begins to increase exponentially with changes in leakage resistance. This critical value of resistance also coincides with the resistance above which the generated current begins to drop off, as described in connection with FIGURE 2. Hence, a cell can be operated in the logarithmic range by providing a leakage resistance exceeding this critical value; however it should not be large enough to cause the cell to develop a potential higher than approximately 90% of its characteristic open circuit potential. For, when the resistance exceeds this latter limit, the current ceases to vary logarithmically and begins to asymptotically approach the characteristic potential. A cell operated in the logarithmic range can be used to generate an input current for an analog computer or other device in which it is desired to provide an exponentially varying current.

In the third, or asymptotic, range the voltage is insensitive to resistance changes but is very responsive to changes in chemical asymmetry such as might be produced by temperature changes or variations of electrode characteristics. In this latter range, cell voltage can be used to index temperature or to analyze alloys, identify metals or other materials, and to measure corrosion rates or oxidization rates of materials. Additionally some crystalline structures can be identified by means of the voltage developed by an electrode. This has been experimentally verified by making a series of measurements of voltage decreased with the passage of time indicating a definite correlation between crystalline structure and developed voltage.

The current generated also varies with load resistance, the behavior of a typical cell being illustrated by curve 30. Just as the closed circuit voltage varies in three different ways, the current generated changes with resistance in three distinct manners. Curve 30 may be divided into three regions corresponding to these three different types of current variation. There is a region, marked 31, in which the current is constant irrespective of the value of leakage resistance. There is a second region indicated generally at 32 over which the current decreases logarithmically from its maximum value, and a third region marked 33 in which the current asymptotically approaches zero. These three regions of current behavior correspond respectively with the linear, logarithmic and asymptotic regions of the voltage curve of FIGURE 1. In addition to the uses suggested previously, as suggested by this plot, the cell may also be used as a constant current generator by operating it with a load resistance below the critical value in the region shown at 31. For any cell the value of critical resistance can be experimentally determined either by beginning with a relatively low resistance and increasing it until the generated current begins to decrease, or by starting with a relatively large resistance and decreasing it until the current ceases to increase.

Figure 3:
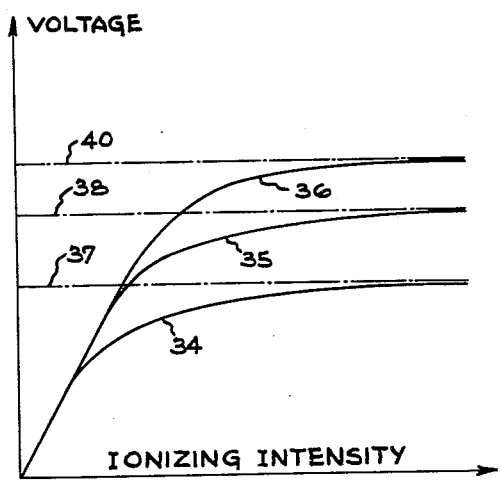
FIGURE 3 illustrates the correlation between developed voltage and ionizing intensity.

FIGURE 3 shows the variation of closed circuit voltage with the intensity of the ionizing medium. Three curves are shown, 34, 35 and 36, representing the variations in voltage of three cells which have characteristic potentials indicated by lines 37, 38 and 40. Considering only curve 34, it will be seen that at first the voltage increases linearly with increasing ionizing intensity. This is true for low values of ionizing intensity, but as the ionizng source becomes stronger and the electrodes are driven toward their characteristic potential, the voltage increases less and less for equal increments, of ionizing intensity. A cell can be used to measure the intensity of an ionizing source, such as a quantity of radioactivity or an ultraviolet light by comparing the developed voltage with that developed by the cell when exposed to known sources of intensity. The value of the ionizing energy may be varied by manipulating the geometry of the ionizing activity in relation to the cell as well as by varying its intensity; thus changes in mechanical position causing relative movements of the ionizing source and cell electrodes may also be determined by means of changes in developed voltage.

Figure 4:
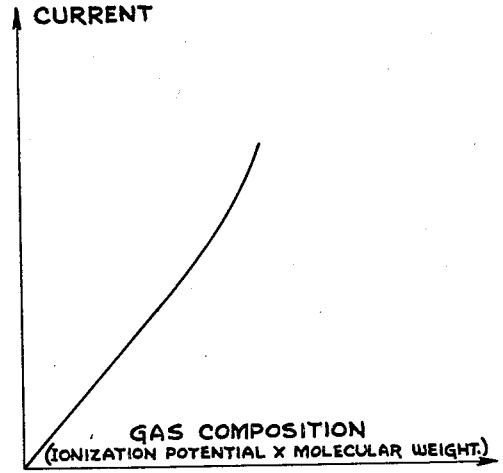
FIGURE 4 illustrates the variation of current with gas composition.

FIGURE 4 is a representation of the manner in which the generated current is dependent upon gas composition. In this figure gas composition is plotted in terms of the product of molecular weight and ionization potential. This variation of current with gas composition can be utilized for limited gas analysis purposes. When analyzing gas by means of a radiant electric generator cell, the current flow generated under certain conditions with a known gas is measured and is then compared with a current flow generated by an unknown gas under the same conditions.

FIGURE 5 shows the variation in developed current with electrode spacing. By constructing a cell in which one electrode is moveable relative to the other, changes in mechanical position can be converted into changes in current. That is, one electrode is held stationary and the other is linked to the element whose movement is to be determined; then by measuring the current generated the amount of movement or the exact position of the element can be determined. Strain gauges and similar devices can be constructed using this principle.

One suitable cell of the type embodying a moveable electrode is semi-diagrammatically shown in FIGURE 12. As there shown, cell 110 comprises a housing 111, one end of which encloses a ring of Teflon 112 or other insulating material which supports an electrode 113. Electrode 113 may be formed, for example from lead foil coated with a metallic oxide. One lead 114 of this cell is taken from electrode 113 through the housing by means of a glass to Kovar seal (not shown). Housing 111 slidably supports a piston 115 which is journalled in an insulating block 116 mounted in one wall of the housing. Piston 115 can be formed of a metal such as zinc which constitutes a negative electrode when used with metallic oxide electrode 113. A lead from piston 115 and lead 114 from electrode 113 are connected across load resistor 117.

FIGURE 6 discloses the manner in which gas pressure affects developed voltage. Curves 42 and 43 are plotted for two different gases, curve 42 representing a gas such as nitrogen, and curve 43 representing a heavier gas such as argon. The voltage developed initially increases in direct proportion to increases in gas pressure. However, for higher gas pressures, the closed circuit voltage varies exponentially with the gas pressure. By comparing the voltage reading taken when the cell contains a gas of unknown pressure with reading observed at known gas pressures, the unknown gas pressure may be indexed. It is also possible by providing a piston or some similar means for varying gas pressure, to use the observed voltage to measure changes in mechanical position of the piston.

One form of cell including means for changing the pressure of the filling gas is diagrammatically illustrated in FIGURE 13. As shown, cell 120 includes housing 121 which supports an annular ring 122 formed of Teflon or other insulating material. This ring is configured to form two inwardly facing grooves adapted to support positive electrode 123 and negative electrode 124 in spaced relationship to one another. These electrodes can be formed of any suitable material; for example positive electrode 123 can be constituted by a disc coated with aquadag or colloidal graphite. Negative electrode 124 can be formed by a pure metallic disc such as one formed of zinc or copper. Suitable leads 125 and 126 are taken from these electrodes and are connected across load resistor 127. A filling gas is entrapped within the housing. Its pressure can be varied by shifting piston 128 to the left or right, the periphery of the piston being provided with an O ring 130 to provide an air tight seal between the piston and housing.

FIGURE 7 shows the variation in power developed by a cell with variations in load resistance. As shown, at first the power increases linearly as the voltage increases, and then the power levels off at a maximum before it finally decreases and asymptotically approaches zero. In order to operate a cell for power purposes at maximum efficiency, the cell should be proportioned in relation to the external load so that it operates at a point just beyond the constant current or linear voltage range. I have determined that it is more efficient from the point of view of power production to operate a set of cells connected in series, each cell operating at substantially one-half of its open circuit voltage than to attempt to obtain equivalent power by operating a larger cell closer to its open circuit potential.

FIGURE 14 is a schematic circuit diagram showing a plurality of cells connected in series and a circuit for measuring the power developed by the cells. As shown, three cells 140, 141, and 142 are connected in series with load resistor 143. A current measuring device 144 is placed in series circuit connection with the cells and with the load resistor; while a voltage measuring device 145 is connected across the resistor to measure the pressure drop across it. The power developed by the cells can readily be calculated from the well known relationship that power in watts equals the current measured in amperes times the voltage measured in volts.

The method and apparatus herein disclosed provide the bases for many practical and extremely useful generating systems. While in the past there have been academic suggestions of generating phenomena somewhat similar to the present one, these suggestions have been concerned with theoretical investigations of the nature of electrical potential. For example, the October 31, 1924, issue of "The Electrician" contains a brief reference to an address by Mr. J. B. Kramer describing experiments in which a radioactive coating is applied to one of two opposed plates. A somewhat similar experimental arrangement is described in "Introductory Electrodynamics for Engineers" by Bennett and Crother, published by McGraw-Hill Book Company in 1926. On pages 273 and 274, the authors describe a cell including dissimilar electrodes, of theoretical interest in the investigation of contact potential.

In each of the publications described above, it is stated that the voltage depends solely upon the dissimilarity of the metals. Each of these articles is concerned with experiments performed under static conditions for deriving fixed potentials. In contrast, the present invention is concerned with the dynamic behavior of a novel generating system and the methods by which such a system can be manipulated to index a variable condition.

As explained above, the present invention is predicated upon the emperical determination and discovery that when a leakage resistance is placed between the electrodes, the potential developed by the electrodes is dependent upon the following field variables including electrode composition, electrode temperature, gas pressure, gas composition, gas temperature, area of the exposed electrode surfaces and the ionizing radiation; and that by maintaining all of these field variables except one constant, the changing field variable can be accurately indexed by measuring the potential. The present invention further comprehends the discovery that all other variables being held constant, the potential developed by the cell varies in unique manners with changes in the external resistance.

Having described my invention, I claim:

1. In a method of indexing a variable condition by generating a voltage from ionic energy, in which the developed voltage is affected by the variable condition but is not affected by factors influencing the chemical asymmetry of the electrode, the steps of exposing the surfaces of two electrochemically dissimilar electrodes to a plasma of ions formed by exposing an ionizable gas to ionizing radiation, influencing one of the field variables by the condition to be indexed, and connecting an external leakage resistance between said electrodes, said resistance being smaller than the critical value, measuring the potential developed by said electrodes and comparing said potential with a potential developed under known conditions.

2. An apparatus for producing a constant current, said apparatus comprising two spaced electrodes having exposed surfaces, an ionizable gas in contact with said surfaces, means remote from said electrodes for converting said ionizable gas into a plasma of ions, said electrodes being chemically dissimilar from one another whereby an asymmetric field exists between the electrodes causing a differential migration of ions to the electrodes, and an external leakage resistance connected between the electrodes, the resistance being smaller than the critical value, whereby said current remains substantially constant for a considerable range of said resistance.

3. An apparatus for developing an electrical potential variable in a predetermined linear manner, with changes in resistance, said apparatus comprising two electrodes respectively having exposed surfaces which are chemically dissimilar, a plasma of ions in contact with said electrodes, a source of ionizing energy effective to form ions in said plasma, an external leakage resistance connected between said electrodes, said resistance being less than the critical resistance value, and means for varying said resistance to vary said voltage linearly.

4. A method of generating a constant current, said method comprising immersing two electrodes in an ionizable gas and converting said ionizable gas into a plasma of ions by supplying energy thereto, said electrodes being chemically dissimilar whereby an asymmetric field exists between the electrodes causing a differential migration of ions to said electrodes, and connecting an external leakage resistance between said electrodes, said resistance being smaller than the critical value.

5. A method of developing an electrical potential, said potential being variable in a predetermined linear manner, said method comprising immersing two electrodes in an ionizable gas and converting said ionizable gas into a plasma of ions by supplying energy thereto, said electrodes respectively having exposed surfaces which are chemically dissimilar, connecting an external leakage resistance between said electrodes, said resistance being less than the critical resistance value, and varying said resistance to vary said voltage linearly.

References Cited in the file of this patent

UNITED STATES PATENTS

| | | |
|---|---|---|
| 1,939,067 | Legg | Dec. 12, 1933 |
| 2,499,626 | Bowman | Mar. 7, 1950 |
| 2,517,120 | Linder | Aug. 1, 1950 |
| 2,543,570 | Eder | Feb. 27, 1951 |
| 2,555,116 | Coleman | May 29, 1951 |
| 2,555,143 | Linder | May 29, 1951 |
| 2,696,564 | Ohmart | Dec. 7, 1954 |

OTHER REFERENCES

A New Electronic Battery, published in the Electrician, vol. 10, page 497, dated Oct. 31, 1924.